No. 732,263. Patented June 30, 1903.

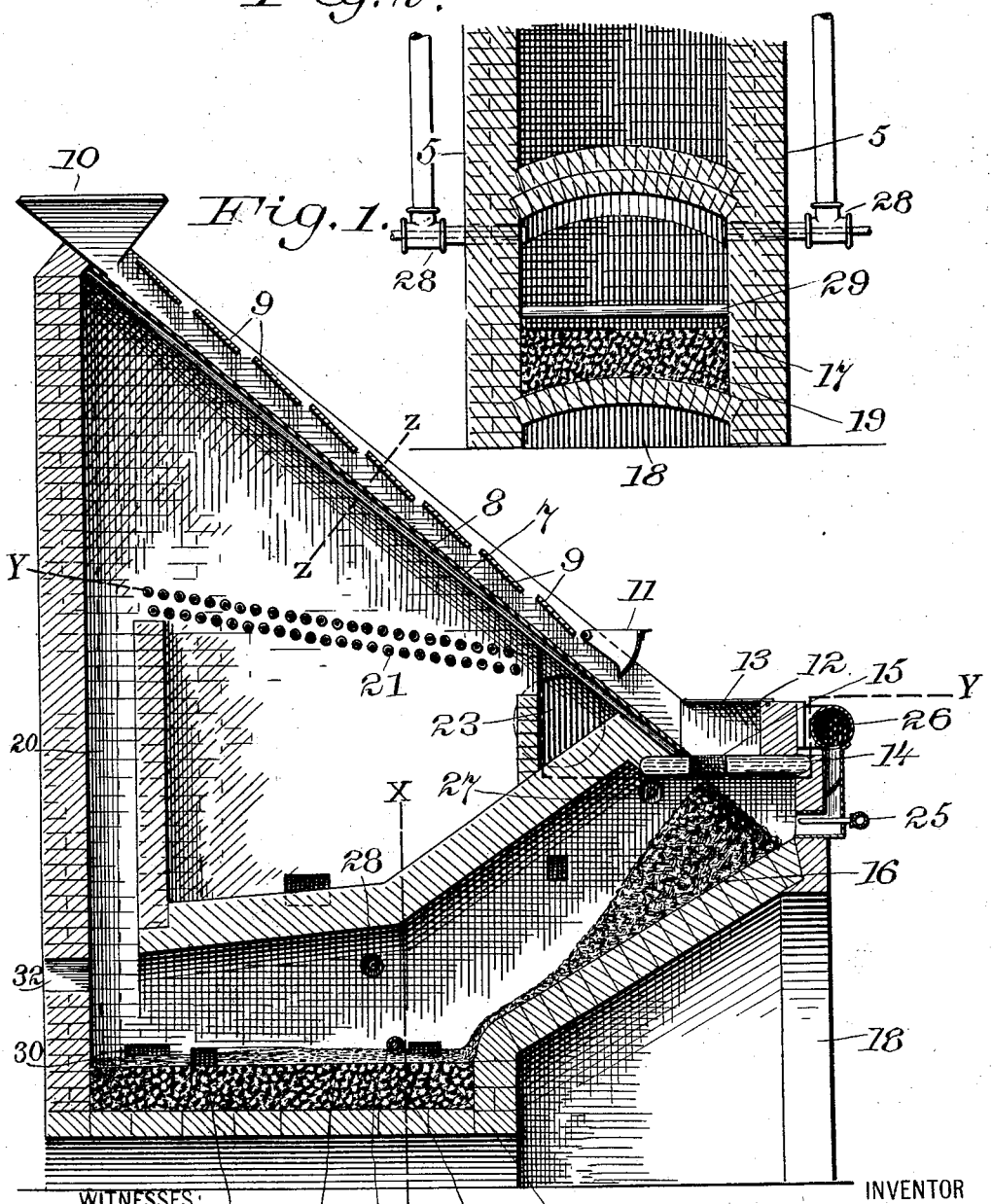

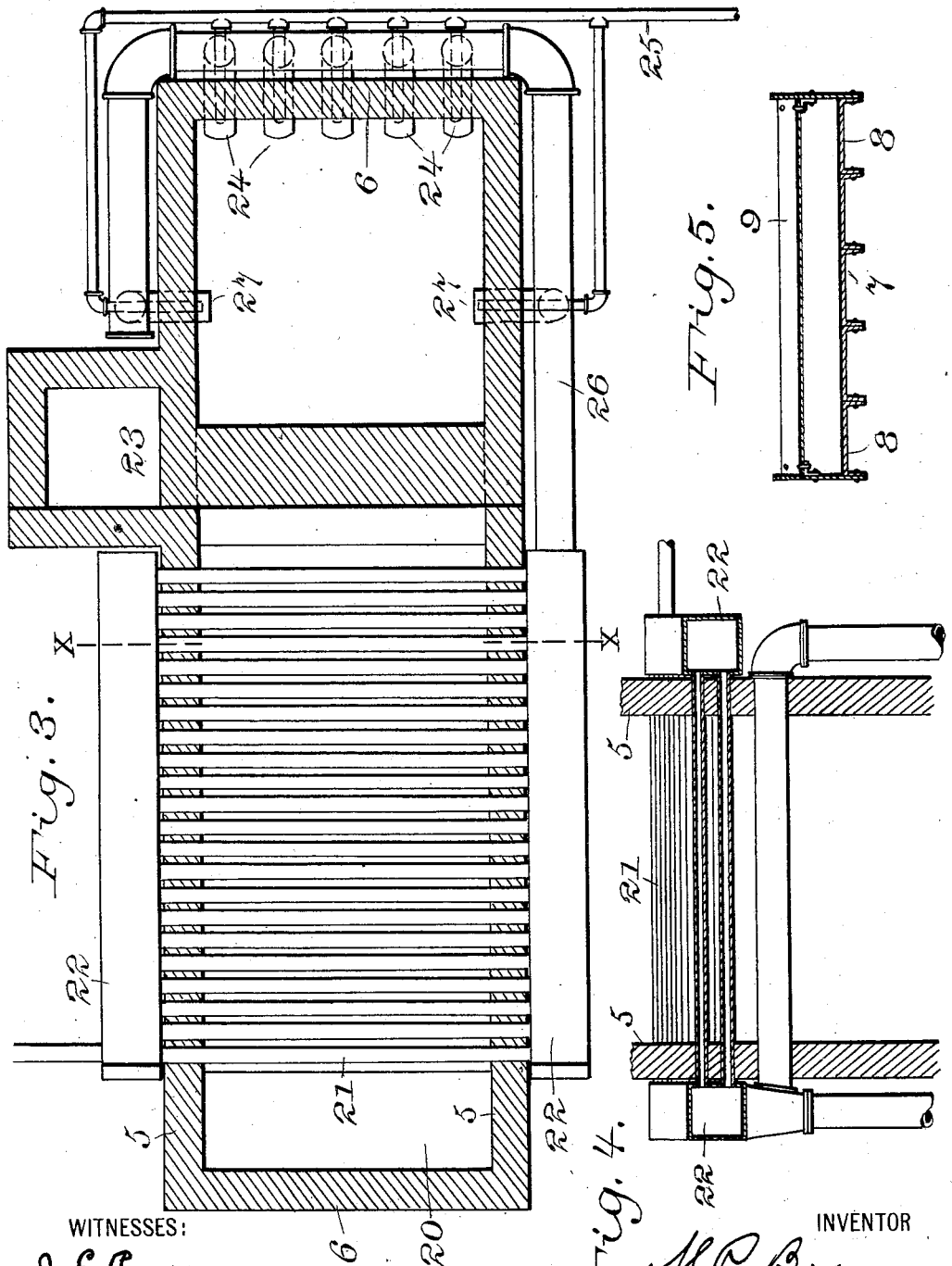

UNITED STATES PATENT OFFICE.

MARTIN PRIOR BOSS, OF SAN FRANCISCO, CALIFORNIA, ASSIGNOR TO THE HYDRO-CARBON SMELTING COMPANY, A CORPORATION OF WEST VIRGINIA.

METALLURGICAL FURNACE.

SPECIFICATION forming part of Letters Patent No. 732,263, dated June 30, 1903.

Application filed February 15, 1902. Serial No. 94,336. (No model.)

*To all whom it may concern:*

Be it known that I, MARTIN PRIOR BOSS, a citizen of the United States, residing at San Francisco, county of San Francisco, State of California, have invented certain new and useful Improvements in Metallurgical Furnaces, of which the following is a specification.

My invention relates to a furnace adapted within a single structure to reduce a metal from its ore, to oxidize the metal, or otherwise act upon it to free it from its accompanying impurities.

The invention consists in the construction and arrangement, as regards each other, of the various chambers in which the metallurgical operations are conducted; also, to the means employed for heating the calcining-chamber and for producing the required reducing and oxidizing atmospheres in the other chambers; also, to the means employed whereby the introduced and generated gases and the products of combustion are caused to follow a downward path and pass through the oxidizing-chamber before leaving the furnace structure; also, to the employment in connection with the oxidizing-chamber of a hearth formed wholly or in part of materials which will chemically coact with the material under treatment or with the accompanying metals or slags; also, to the various details of construction of the furnace.

The objects of my invention are, primarily, to carry on all the metallurgical operations required to reduce a metal from its ore in the same structure, and thus materially reduce the cost of handling and also the loss of heat below that common where the various steps of the treatment take place in separate structures; secondarily, to make use of the waste heat—that from the reducing-chamber to aid in the oxidation of the metal and the separation of the metal from its impurities in the oxidizing-chamber and that from the reducing and oxidizing chambers to indirectly heat the calcining-chamber; and, finally, to effect through the employment of a hearth formed as a whole or in part of materials which will coact with the metal or its accompanying bodies under treatment a more perfect separation of the metal from its accompanying substances than can be obtained by the separate introduction of fluxing materials.

The accompanying drawings will serve to illustrate my invention and in which similar numerals indicate like parts.

Figure 1 is a vertical section. Fig. 2 is a transverse section on the line X X of Fig. 1. Fig. 3 is a horizontal section on the line Y Y of Fig. 1. Fig. 4 is a vertical section on the line X X of Fig. 3. Fig. 5 is a section on the line Z Z of Fig. 1.

In the drawings, 5 5 represent side walls of the furnace; 6 6, front and rear walls.

The top of the furnace is covered by a metallic cover 7, of any suitable construction, preferably of a series of connected longitudinal plates 8, Fig. 5. Arranged transversely above the cover are a series of separated inclined plates 9. The space between the cover 7 and the inclined plates 9 forms a chute. Mounted on the top of the chute is a hopper 10, and pivoted near the bottom of the chute is a bucket-valve 11. Situated at the bottom of the chute is a receptacle 12, provided with a cover 13, and arranged under the receptacle is a hollow plate 14, through which water is adapted to be forced. This plate is provided with an opening 15.

The bottom of the furnace is provided with two hearths, the forward one of which, 16, is inclined, and the latter, 17, horizontal. Under each of these hearths is formed a cave 18 for ventilating purposes. In the drawings I have shown the hearths 16 and 17 as of approximately equal length. I do not limit myself to such construction, as the relative length of these hearths may be altered as desired. For instance, the hearth 16 may be made much shorter than the hearth 17, and vice versa. Further, in the drawings I have shown the hearth 17 as having formed upon it a friable bed 19, which bed may be made of rough or partially-fused ore or in case where copper is the metal to be produced of copper matte or copper matte and ore mixed, or for reasons now well understood I may form the bed wholly or partially of dolomite or other body which will chemically coact with the metal under treatment or with some body or bodies accompanying the metal.

20 indicates a vertical flue within the furnace; 21, a series of pipes communicating with the boxes 22 on the exterior of the furnace and through which air may be forced under pressure and heated in its passage; 23, flue to chimney-stack.

Arranged across the front of the furnace are a series of hydrocarbon injector-burners 24. These burners are fed with fuel through the pipe 25 and with air under pressure through the pipe 26. Similar injector-burners 27, similarly fed, are arranged opposite each other within the cavity of the chamber which forms the first hearth, and similar burners 28, similarly fed, are arranged within the cavity of the chamber which forms the second hearth. I do not limit myself to the precise number or location of such burners nor is it my intention to feed all of such burners with fuel and air, as I may find it convenient to use some of the burners as reducing-burners—that is, using fuel and air—or some of such burners as oxidizing-burners, using merely air.

Arranged across the second hearth 17 is a slag-dam 29. This dam may consist of a pipe through which water is fed and surrounded by a clay body or it may be a floating dam. I do not limit myself to the precise position of the dam shown relative to the hearths 16 and 17. The position of the dam upon the hearths will in some respects depend upon the character of the ore treated. If the ore is a heavy ore and does not slide upon the hearth 16, the dam may be placed as shown. If, however, the ore is easily reduced and tends to slide upon the hearth 16, the dam will be placed farther back upon the hearth 17.

30 represents slag-doors; 31, door for drawing off metal; 32, door through which the interior of the furnace may be observed.

The general operation of my device is as follows: The ore, with the required flux, is fed into the hopper 10 and falls by gravity through the chute until it reaches the bucket-valve 11. The ore in its passage down the chute is heated by conduction through the cover of the furnace 8, the evolved gases escaping through the openings 32 between the inclined plates 9. At stated intervals the bucket-valve 11 is opened and a certain amount of the ore allowed to feed down into the compartment 12 and through the opening 15 onto the inclined hearth 16. Instead of charging the ore at stated intervals the ore may be fed continuously down the chute. In this case, however, it will be necessary to cover the hopper to prevent furnace-gases flowing from the first hearth up through the chute. When sufficient ore has been charged upon the hearth 16, the flame from the hydrocarbon-burners 24 27 is caused to act upon it. The heating effect of the flame may be obtained by allowing the flame to impinge upon the ore or by freely developing the flame and radiating the heat.

I wish it understood that I do not limit myself to the employment of hydrocarbon-burners, as it will be evident that the furnace may be heated by producer-gas, atomized fuel, or direct combustion.

As the ore and flux are charged onto the hearth 16 and come under the influence of the heat from the burners or other source, a reduction of the ore takes place. In the case of iron the reduction is due entirely to the action of the flame. In the case of copper the reduction is aided by the decomposition and burning of the sulfur of the ore. As the ore is reduced it flows down the inclined hearth 16, accompanied by slag, and onto the hearth 17. The slag by reason of the dam 29 and slag-door 20 is held from moving down along the hearth 17 and is drawn from the furnace. When the metal or matte is deposited upon the hearth 17, it is subjected to the action of two forces—i. e., the reducing or oxidizing force due to the burners 28 and, second, to the flux or chemical action of the bed prepared on the hearth 17. For instance, in the case of copper the sulfur is largely burned out of the ore upon the bed 16. The ore falls upon the bed 17 as a rich matte. Here it is subjected to an oxidizing-flame by means of the burner 28, with the effect that the remaining sulfur, silica, and iron are oxidized, leaving floating upon the top of the bed either a pure metal or a very rich matte, which may be drawn off through the door 31.

I do not limit myself in any wise to the exact character of bed which may be introduced upon the hearth 17, as very many different beds may be introduced, all of which will exert well-known chemical actions upon the metal or its accompanying bodies discharged over them.

The hot gases due to combustion of the fuel introduced through the burners 24 27 at the upper end of the hearth 16, as well as those due to the decomposition of the ore body when pyritic ores are under treatment, pass in a downward direction over the hearth 16, across the hearth 17, and through the flue 20 to the interior of the furnace structure, around the pipes 21, and under the plates 9 of the chute, leaving the furnace through the exit-flue 23. By this means I am enabled to produce an oxidizing atmosphere over the hearth 17, which, it will be observed, is not directly connected to the external atmosphere, and to utilize the waste heat for heating the air used in combustion, as also for heating the floor of the chute 9, the heat from such floor serving to wholly or partially calcine the ore fed down the chute.

Having thus described my invention, I claim—

1. In a metallurgical furnace, the combination of a chamber provided with an inclined hearth, means located in the upper portion of said chamber for heating said chamber, a second chamber having a horizontal hearth connected to the lower end of the inclined hearth, means located in said chamber for heating said chamber, and an exit-flue leading from the second chamber and situated opposite to the point of connection of the two chambers.

2. In a metallurgical furnace, the combination of a calcining-chamber, a chamber provided with an inclined hearth, a second chamber having a horizontal hearth connected to the lower end of the inclined hearth, means for indirectly heating the calcining-chamber, and means for creating a reducing atmosphere over the inclined hearth and an oxidizing atmosphere over the horizontal hearth.

3. In a metallurgical furnace, the combination of a chamber provided with an inclined hearth, means for producing a reducing atmosphere in said chamber, a second chamber connected to the lower end of the first chamber and provided with a horizontal hearth, and a bed or bottom formed of materials which will chemically combine with the partially-reduced metal or ore body discharged on it.

4. In a metallurgical furnace, the combination of a chamber provided with an inclined hearth, means for producing a reducing atmosphere in said chamber, a second chamber connected to the lower end of the first chamber and provided with a horizontal hearth and means for creating an oxidizing atmosphere, and a bed or bottom formed of materials which will chemically combine with the partially-reduced metal or ore body discharged on it.

5. In a metallurgical furnace, the combination of an inclined ore-chute having a metal bottom and ventilated top, a chamber into which the ore-chute delivers, having an inclined bottom, means for creating a reducing atmosphere in the upper portion of said chamber, a second chamber connected to the lower end of the first chamber and provided with a horizontal hearth, and an exit-flue for the products of combustion from said furnace having a portion of its walls formed from the bottom of said ore-chute.

6. In a metallurgical furnace, the combination of an inclined calcining-chamber, an inclined reducing-chamber, connected at its upper part to the lower end of the calcining-chamber, but open to the atmosphere, a horizontal oxidizing-chamber connected to the lower end of the reducing-chamber, an exit-flue from said oxidizing-chamber and situated opposite to the point of connection of the oxidizing and reducing chambers, means for creating a reducing atmosphere in the reducing-chamber, an oxidizing atmosphere in the oxidizing-chamber and for externally heating the calcining-chamber.

7. In a metallurgical furnace, the combination of a chamber provided with an inclined hearth, means for introducing a hydrocarbon fuel longitudinally and transversely of said chamber, a second chamber provided with a horizontal hearth connected to the lower end of the first chamber, means for introducing a hydrocarbon fuel transversely of said chamber, and an exit-flue leading from said second-named chamber and situated opposite to the point of connection of the two chambers.

8. In a metallurgical furnace, the combination of a chamber provided with an inclined hearth, means for introducing hydrocarbon fuel longitudinally of said chamber in a downward direction, a second chamber provided with a horizontal hearth connected to the lower end of the first chamber, means for heating said second chamber, and means for introducing air under pressure in said chambers.

In testimony whereof I affix my signature in the presence of two witnesses.

MARTIN PRIOR BOSS.

Witnesses:
J. E. PEARSON,
C. E. STECHER.